United States Patent
Patz et al.

(10) Patent No.: US 10,454,260 B2
(45) Date of Patent: Oct. 22, 2019

(54) ELECTRICAL CONNECTOR ASSEMBLY

(71) Applicant: Delphi Technologies, LLC, Troy, MI (US)

(72) Inventors: Olaf Patz, Wohltorf (DE); Tomasz Slizowski, Cracow (PL)

(73) Assignee: DELPHI TECHNOLOGIES, LLC, Troy, MI (US)

( * ) Notice: Subject to any disclaimer, the term of this patent is extended or adjusted under 35 U.S.C. 154(b) by 0 days.

(21) Appl. No.: 16/153,914

(22) Filed: Oct. 8, 2018

(65) Prior Publication Data

US 2019/0109447 A1 Apr. 11, 2019

(30) Foreign Application Priority Data

Oct. 9, 2017 (EP) .................... 17195502

(51) Int. Cl.
| | |
|---|---|
| *H02G 3/16* | (2006.01) |
| *B60R 16/023* | (2006.01) |
| *H02G 15/10* | (2006.01) |
| *H01R 13/58* | (2006.01) |
| *H01R 13/6581* | (2011.01) |
| *H01R 13/502* | (2006.01) |
| *B60R 16/02* | (2006.01) |
| *H02G 3/08* | (2006.01) |
| *H01R 4/28* | (2006.01) |
| *H01R 11/09* | (2006.01) |
| *H01R 13/6592* | (2011.01) |

(52) U.S. Cl.
CPC .......... *H02G 3/16* (2013.01); *B60R 16/0215* (2013.01); *B60R 16/0238* (2013.01); *H01R 13/502* (2013.01); *H01R 13/58* (2013.01); *H01R 13/6581* (2013.01); *H02G 15/10* (2013.01); *H01R 4/28* (2013.01); *H01R 11/09* (2013.01); *H01R 13/6592* (2013.01); *H01R 2201/26* (2013.01); *H02G 3/086* (2013.01)

(58) Field of Classification Search
CPC ........................................................ H02G 3/16
USPC ........................................................ 174/71 R
See application file for complete search history.

(56) References Cited

U.S. PATENT DOCUMENTS

| | | | | |
|---|---|---|---|---|
| 5,266,740 A | * | 11/1993 | Hsu ..................... | H01R 13/516 174/135 |
| 5,306,870 A | * | 4/1994 | Abat ................... | H01R 9/0506 174/659 |
| 5,378,853 A | * | 1/1995 | Clouet ................ | H01B 7/0045 174/36 |
| 2004/0252446 A1 | | 12/2004 | Friedrich et al. | |
| 2015/0047870 A1 | | 2/2015 | Tanaka et al. | |
| 2015/0303615 A1 | | 10/2015 | Daugherty, Jr. et al. | |

FOREIGN PATENT DOCUMENTS

DE 102013016099 A1 4/2015

* cited by examiner

*Primary Examiner* — Stanley Tso
(74) *Attorney, Agent, or Firm* — Robert J. Myers

(57) ABSTRACT

An electrical junction box, preferably configured for use in electrical or hybrid vehicles, includes a junction box housing and a bus bar element located inside the junction box housing. The junction box housing has a first opening for receiving end portions of electrical cables. The bus bar element comprises connecting means configured to connect ferrules, provided at the wire end portions of the electrical cables. The junction box housing is made of a plastic material and the bus bar element is made of metal.

11 Claims, 5 Drawing Sheets

ELECTRICAL CONNECTOR ASSEMBLY

CROSS-REFERENCE TO RELATED APPLICATION

This application claims the benefit under 35 U.S.C. § 119(a) of Patent Application No. 17195502.4 filed in the European Patent Office on Oct. 9, 2017, the entire disclosure of which is hereby incorporated by reference.

TECHNICAL FIELD OF THE INVENTION

The invention relates to an electrical junction box for use in wire harnesses for hybrid (PHEV) or electrical vehicles (BEV) and a high voltage harness that employs the electrical junction box.

BRIEF DESCRIPTION OF THE SEVERAL VIEWS OF THE DRAWING

The present invention will now be described, by way of example with reference to the accompanying drawings, in which:

FIG. 1 shows a perspective view of an electrical junction box according to one embodiment of the invention;

DETAILED DESCRIPTION OF THE INVENTION

Figure 1:
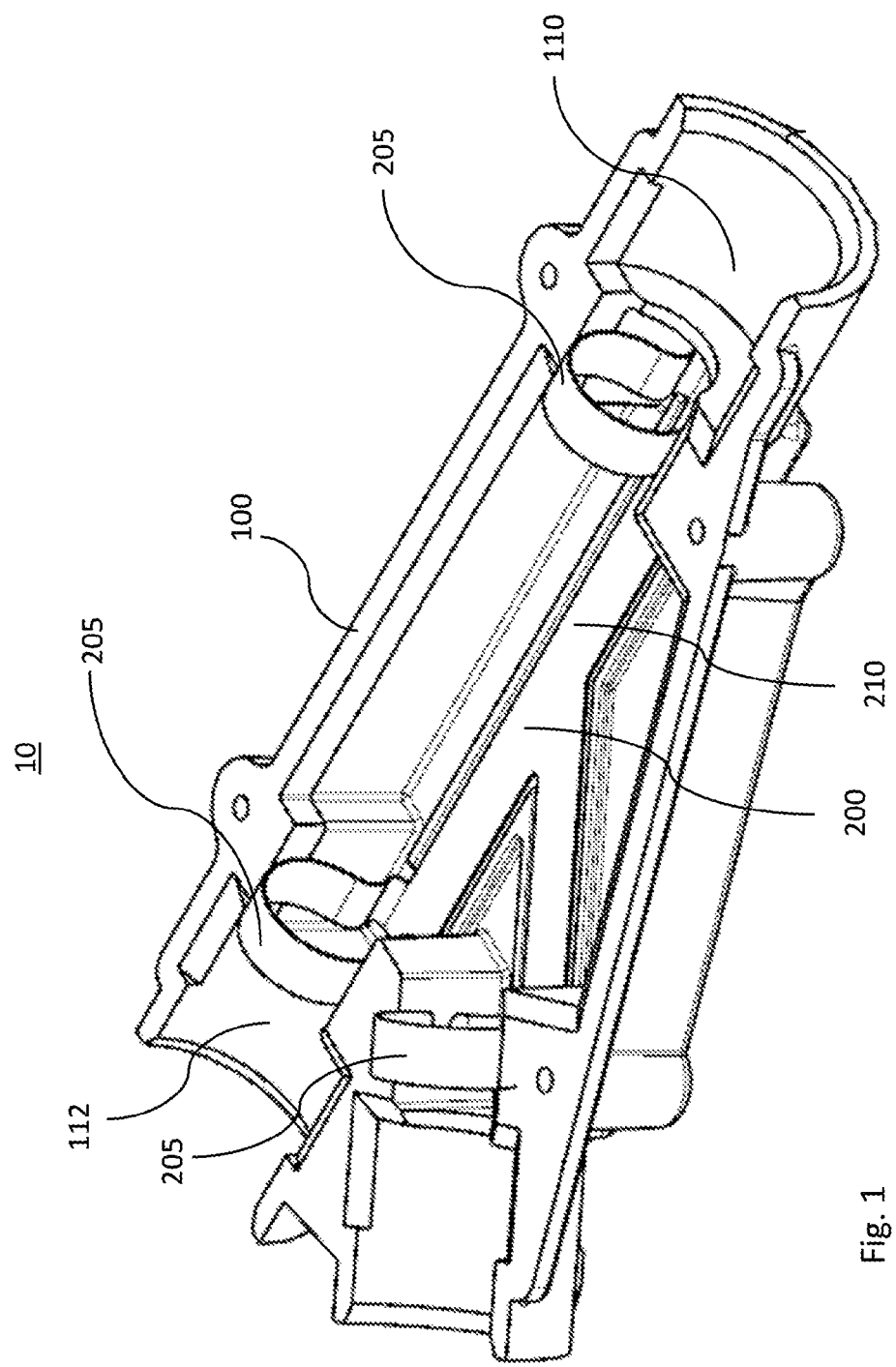
FIG. 1 shows a perspective cross section view of a network connector assembly according to one embodiment of the invention.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The vehicle electrification is in progress for years and requires new designed wire harnesses. The use of high voltage in vehicles requires improved insulation abilities for safety reasons. Furthermore, the high voltage wire harness has to be complete shielded to prevent electromagnetic radiation to the environment. The electromagnetic radiation could disturb e.g. the sensors of autonomous driving vehicles. To reduce the amount of long cables by using distributor connections in standard wire harnesses is well known in the art. When using shielded high voltage cables the distributor connections are more complex. Usually the electrical junction box has a protective housing made of metal that provide mechanical protection and the shielding ability for the high voltage cables inside. The shielding braids of the shielded cables are connected to the protective housing and establish shielding continuity of all cables and the protective housing. On driving mode or in case of a failure caused by a damage on the high voltage wire harness the shielding braid can be containing high voltage. In that case, the protective housing needs to guide high current. On failure mode until the safety circuit switch of the high voltage shut down the system. This loads depend on the requested device power or failure line. The protective housings are made usually of aluminum. The aluminum housings need for safety reasons a protective layer or a housing made of electrical isolative material arranged around the aluminum housing. Otherwise an extra ground connection will be necessary. In summary the protective housings made of aluminum are heavy and expansive and will need an additional cover or ground.

Thus, there is the need in the art to provide an electrical junction box that fulfills the requirements for high voltage wire harnesses, that is lightweight and cheap to manufacture, and that can be assembled in a fast and reliable assembly process.

Therefore, in one aspect, the present invention improves the state of the art by providing an electrical junction box for high voltage wire harnesses that solves the above-mentioned problems, that is lightweight and cheap to manufacture, that can be assembled in a fast and reliable assembly process and that do not need any additional isolative cover.

An electrical junction box according claim 1 solves these and other objects, which become apparent upon reading the following description.

The present application relates to an electrical junction box, for electrical (BEV) or hybrid vehicles (PHEV), comprising a junction box housing and a bus bar element located inside the junction box housing. The junction box housing comprises at least a first opening for letting in end portions of electrical cables. The bus bar element comprises connecting means configured to connect ferrules, provided at the wire end portions of the electrical cables. The junction box housing is made of plastics and responsible for the damping performance and the bus bar element is made of metal and responsible for the electrical performance (low resistance).

The disclosed invention provides an electrical junction box that separates the shielding requirements and the requirement to guide the high failure current from one shielding braid to another shielding braid. The shielding function will be provided by a junction box housing made of a plastic with shielding ability but without the ability to guide high current. The function of guiding the high current in case of failure or high current load in the cables, will be done by a low resistant bus bar element, that is made of metal and located inside the junction box housing. The bus bar element is connectable to all shielding braids of the high voltage cables.

According to a preferred embodiment, the junction box housing is made of electrically conductive plastic. For the junction box housing of the inventive electrical junction box an electrically conductive plastic can be used e.g. PREMIER PBT-225 as offered by Parker Hannifin Corporation. The material making metal to plastic housing conversions possible for demanding automotive electronics applications. Metal to plastic conversions not only eliminate 35% of the housing weight (as compared to aluminum), but also provide up to a 65% cost reduction by eliminating secondary operations such as assembly and machining.

Preferably, the junction box housing is made of nonconductive plastics, having a layer of electrical conductive material on the inner or/and the outer surface. A standard plastic junction box housing can be used, when covered with a layer of electrical conductive material. The conductive material needs to be applied on the outer or on the inner surface of the housing to provide shielding against electromagnetic radiation. The conductive material can be applied, for safety reasons, on the outer and on the inner surface of the housing.

Advantageously, the junction box housing has an elongated shape, wherein the at least first opening is located at a first end of the junction box housing and wherein a second opening is located on a second end of the junction box housing. This design allows housings that are easy to implement into narrow environment.

Preferably, the bus bar element comprises an elongated body, wherein the connecting means are arranged at the ends of the elongated body. This design leaves space for the distributor connections of the high-voltage wires in between the connecting means.

Advantageously, the bus bar element is made from a sheet metal and wings formed from the sheet metal, the wings being configured to be formed around the ferrules, define the connecting means. The elongated body is arranged in one plane and the wings protrude from this plane perpendicular towards the electrical cable. Usually all wings protrude to the same direction. If necessary, the wings can protrude to opposite directions. The bus bar element is cheap to produce by stamping. The stamping machine can also do the bending as a following.

Preferably, the wings are formed semicircular configured surround the ferrules at least partly, that are provided at the wire end portions of the electrical cables, to establish electrical connection. The wings encompass the ferrules tightly to establish mechanical and electrical connection between the ferrules in the bus bar element. Usually the ferrules have a round cross-section so that the wings are preferred shaped semicircular to fit in best way. If the ferrules have had a non-round cross-section, the wings have to be in configured to fit this cross-section.

Preferably, the bus bar element is made of a sheet metal that provide mechanical flexibility. The ferrules are snapped in between the wings while assembly thanks to the flexibility of the material of the bus bar element. This enables a fast and easy assembly process. The electrical and mechanical connection of the wire and the bus bar element can be done when the bus bar element is located outside the junction box housing or when the bus bar element is located inside the junction box housing. This increases flexibility while assembling the electrical junction box.

In a preferred embodiment, the bus bar element is made of steel. A bus bar element made of steel is robust and flexible. A bus bar element made of spring steel is extremely flexible.

Preferably, the bus bar element is designed to carry the necessary current in between the connecting means. The bus bar element is designed to transfer the energy without, or at least with very small losses. A common requirement is a resistance that is lower than 10 Ohm.

Advantageously, the connecting means are located adjacent to the first opening and to the second opening inside the junction box housing. To provide enough space for the distributor connections of the high-voltage wires inside the junction box housing, the connecting means are located adjacent to the first opening and to the second opening.

In a preferred embodiment the junction box housing comprises two half-shells, separable arranged around the bus bar element, defining the junction box housing. To access the bus bar element and the distributor connections, the junction box housing is made of two half-shells that are separable arranged.

Preferably, the elongated body is Y-shaped and wherein the connecting means are arranged at the ends of the Y-shaped elongated body, whereby two connecting means are arranged on one end of the elongated body and whereby one connecting means is arranged at the opposite end of the elongated body. The basic embodiment of a distributor connection comprises usually a three wires connection. To keep the elongated shape, the bus bar element has on one end two connection points and on the other end one connection point. The shape of the elongated body appears as an elongated letter "Y".

Preferred, an electrical wire harness comprising at least three electrical cables and an electrical junction box. The electrical cables comprise ferrules, provided at the wire end portions of the electrical cables thereby electrically connecting a shielding braid. The wire end portions protrude trough at least one opening inside the junction box housing. The ferrules are electrically connected to the connecting means of the bus bar element, thereby electrically connecting the shielding braid of all electrical cables.

Method to manufacture an electrical wire harness comprising the steps:

Providing at least three electrical cables and an electrical junction box;

Open the junction box housing;

Adjusting the wire end portions in relation to the bus bar element in a position that the ferrules are mountable to the connecting means;

Connecting the ferrules to the connecting means;

Closing the junction box housing;

The method is flexible because the steps: Adjusting the wire end portions in relation to the bus bar element in a position that the ferrules are mountable to the connecting means and connecting the ferrules to the connecting means can be carried out while the bus bar element is located inside the junction box housing or is located outside the junction box housing.

FIG. 1 shows a perspective view of an electrical junction box 10. One-half of the junction box housing 100 it is removed to increase the visibility of the interior. A bus bar element 200 it is located inside the junction box housing 100. The junction box housing 100 comprises at least a first opening 110 for letting in wire end portions 310 of electrical cables 300. The bus bar element 200 comprises connecting means 205 configured to connect ferrules 320, provided at the wire end portions 310 of the electrical cables 300. The junction box housing 100 is made of plastics and the bus bar element 200 is made of metal. The junction box housing 100 is made of electrically conductive plastic. Alternative the junction box housing 100 is made of nonconductive plastics, having a layer of electrical conductive material on the inner or the outer surface. The junction box housing 100 can have layer of electrical conductive material on the inner and the outer surface. The junction box housing 100 has an elongated shape, wherein the at least one first opening 110 is located at a first end 120 of the junction box housing 100 and wherein a second opening 112 is located on a second end 122 of the junction box housing 100.

Figure 2:
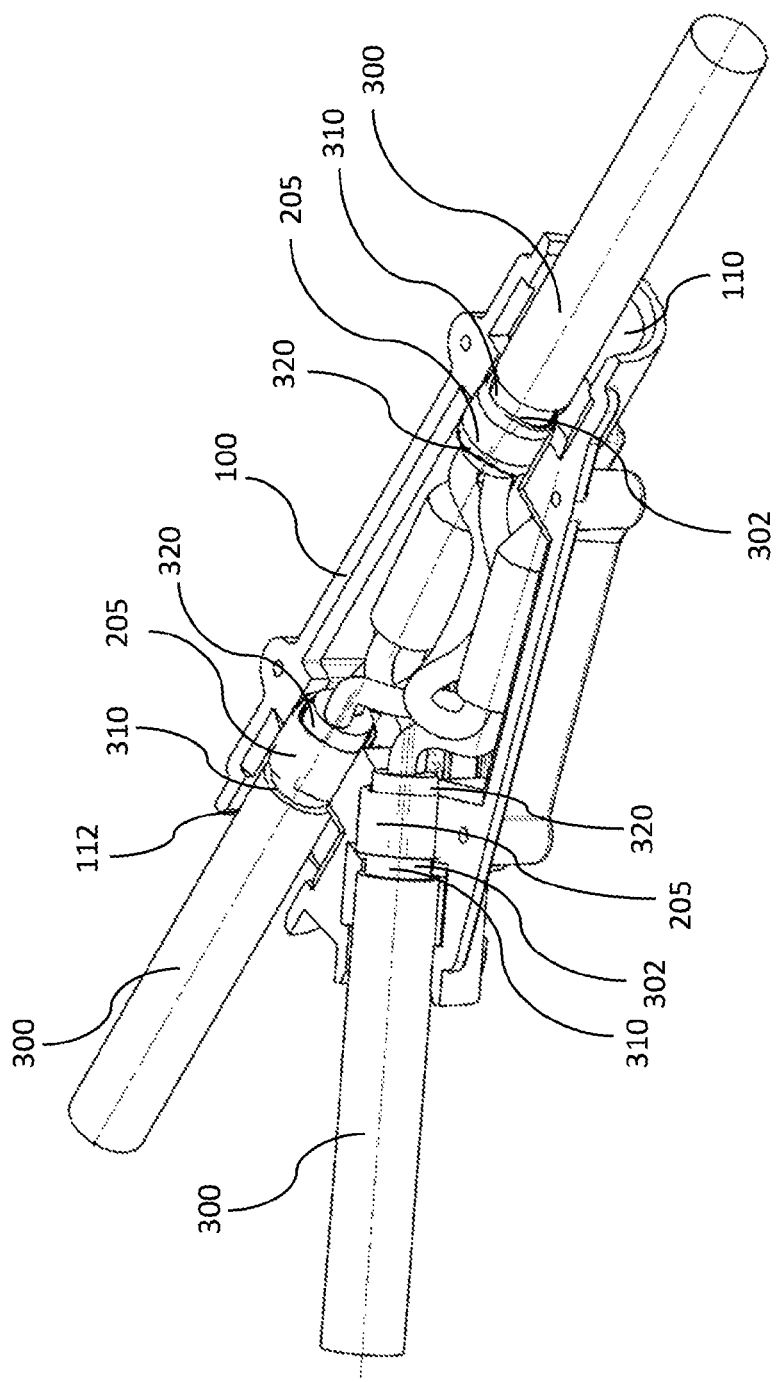
FIG. 2 shows a perspective view of an electrical junction box and attached electrical cables according to one embodiment of the invention.

FIG. 2 shows a perspective view of an electrical junction box 10 and attached electrical cables 300 forming a part of an electrical wire harness. The electrical wire harness comprising at least three electrical cables 300 and an electrical junction box 10. The electrical cables 300 comprise ferrules 320, provided at the wire end portions 310 of the electrical cables 300 thereby electrically connecting a shielding braid 302. The wire end portions 310 protrude trough at least one opening 110 inside the junction box housing 100, the ferrules 320 are electrically connected to the connecting means 205 of the bus bar element 200, thereby electrically connecting the shielding braid 302 of all the electrical cables 300. The connecting means 205 are located adjacent to the first opening 110 and to the second opening 212 inside the junction box housing 100.

Figure 3:
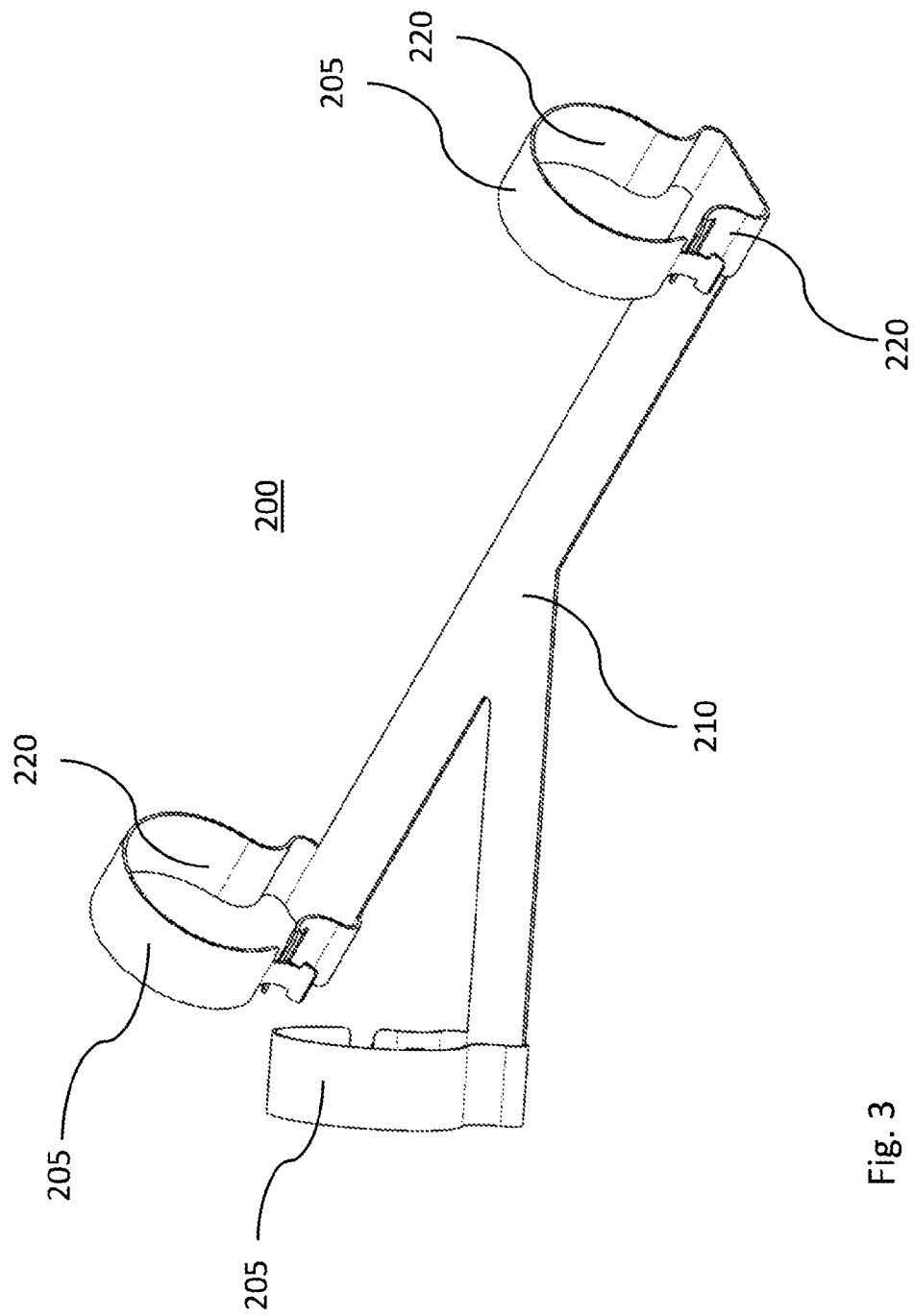
FIG. 3 shows a perspective view of a bus bar element of the electrical junction box according to one embodiment of the invention.

FIG. 3 shows is a perspective view of a bus bar element 200 of the junction box housing 100. The bus bar element 200 comprises an elongated body 210, wherein the connecting means 205 are arranged at the ends of the elongated body 210. The bus bar element 200 is made from a sheet metal and the connecting means 205 are defined by wings 220 formed from the sheet metal, the wings 220 being configured to be formed around the ferrules 320. The wings 220 are formed semicircular configured to, at least partly, surround the ferrules 320, provided at the wire end portions 310 of the electrical cables 300 to establish electrical connection. The bus bar element 200 is made of a sheet metal that provide mechanical flexibility. The bus bar element 200 is made of steel. The bus bar element 200 is designed to carry a current of at least 40 Ampere in between the connecting means 205. The elongated body 210 is Y-shaped and the connecting means 205 are arranged at the ends of the Y-shaped elongated body 210, whereby two connecting means 205 are arranged on one end of the elongated body 210 and whereby one connecting means 205 is arranged at the opposite end of the elongated body 210.

Figure 4:
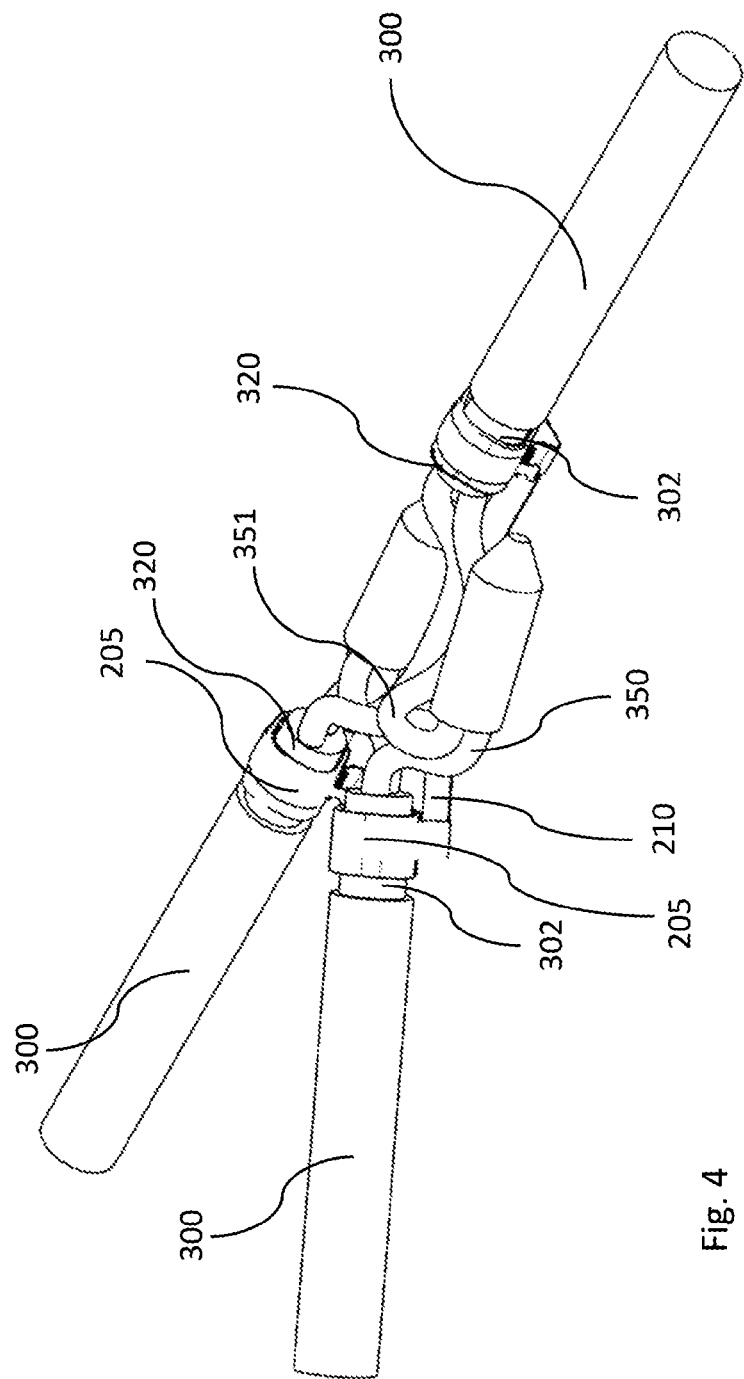
FIG. 4 shows a perspective view of a part of a wire harness with wires connected with an electrical distributor connection according to one embodiment of the invention.

FIG. 4 shows a perspective view of a part of a wire harness with electrical cables 300 that are connected to each other. The wire harness is shown here without the junction box housing 100 to improve visibility of the interconnection of the electrical cables 300. The shielding braids 302 are connected to the bus bar element 200. The high-voltage wires 350, 351 are electrically connected by a distributor connection.

Figure 5:
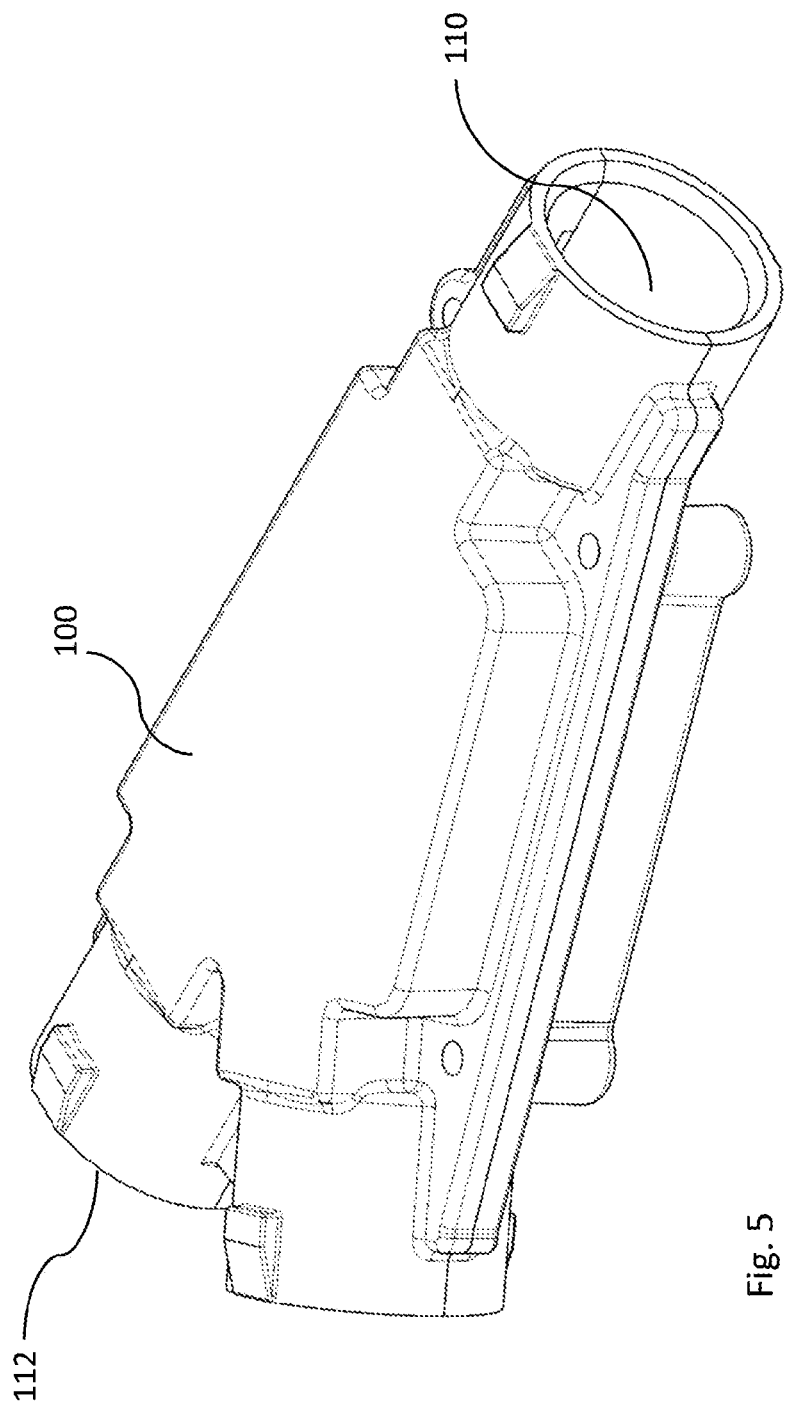
FIG. 5 shows a perspective view of a junction box housing according to one embodiment of the invention.

FIG. 5 shows a perspective view of a junction box housing 100 that comprises two half-shells, separable arranged around the bus bar element 200 not visible, defining the junction box housing 100.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. Moreover, the use of the terms first, second, etc. does not denote any order of importance, but rather the terms first, second, etc. are used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, directional terms such as upper, lower, etc. do not denote any particular orientation, but rather the terms upper, lower, etc. are used to distinguish one element from another and establish a relationship between the various elements.

We claim:

1. An electrical junction box, comprising:
   a junction box housing; and
   an electrical bus bar element located inside the junction box housing,
   wherein the junction box housing comprises openings configured to receive end portions of three electrical coaxial cables having braided shielding surrounding a central conductor,
   wherein the electrical bus bar element comprises semicircular wings configured to be formed to at least partly surround ferrules provided at the end portions of electrical cables to establish electrical connection, thereby electrically interconnecting the braided shielding of the three electrical cables,
   wherein the junction box housing is made of electrically conductive plastic and the electrical bus bar element is made of metal,
   wherein the electrical bus bar element is designed to carry a current of at least 40 Ampere.

2. The electrical junction box according to claim 1, wherein the junction box housing has an elongated shape, wherein a first opening of the openings is located at a first end of the junction box housing, and wherein a second opening of the openings is located on a second end of the junction box housing.

3. The electrical junction box according to claim 2, wherein the connecting means are located adjacent to the first opening and to the second opening inside the junction box housing.

4. The electrical junction box according to claim 1, wherein the electrical bus bar element comprises an elongated body and wherein the connecting means are arranged at ends of the elongated body.

5. The electrical junction box according to claim 4, wherein the elongated body is Y-shaped and wherein the connecting means are arranged at the ends of the elongated body, whereby two connecting means are arranged on one end of the elongated body and whereby one connecting means is arranged at an opposite end of the elongated body.

6. The electrical junction box according to claim 1, wherein the electrical bus bar element is made from a sheet metal.

7. The electrical junction box according to claim 1, wherein the electrical bus bar element is made of a sheet metal that provides mechanical flexibility.

8. The electrical junction box according to claim 1, wherein the electrical bus bar element is made of steel.

9. The electrical junction box according to claim 1, wherein the junction box housing comprises two half-shells defining the junction box housing, said two half-shells separably arranged around the electrical bus bar element.

10. An electrical wire harness, comprising:
three electrical cables; and
the electrical junction box according to claim 1, wherein the three electrical cables comprise the ferrules provided at wire end portions of the three electrical cables, thereby electrically connecting a shielding braid
and wherein the wire end portions protrude through openings inside the junction box housing.

11. A method of manufacturing an electrical wire harness, comprising the steps of:
providing three electrical cables, ferrules, and an electrical junction box comprising a junction box housing and an electrical bus bar element located inside the junction box housing,
wherein the junction box housing comprises openings configured to receive end portions of three electrical coaxial cables having braided shielding surrounding a central conductor,
wherein the electrical bus bar element comprises semi-circular wings configured to be formed to at least partly surround ferrules provided at the end portions of electrical cables to establish electrical connection, thereby electrically interconnecting the braided shielding of the three electrical cables,
wherein the junction box housing is made of electrically conductive plastic and the electrical bus bar element is made of metal,
wherein the electrical bus bar element is designed to carry a current of at least 40 Ampere;
opening the junction box housing;
adjusting wire end portions in relation to the electrical bus bar element in a position that the ferrules are mountable to the wings;
connecting the ferrules to the wings; and
closing the junction box housing.

\* \* \* \* \*